US012580377B2

(12) United States Patent
Zhong et al.

(10) Patent No.: US 12,580,377 B2
(45) Date of Patent: Mar. 17, 2026

(54) FIRE AND EXPLOSION PROOF STRUCTURE FOR HIGH-VOLTAGE CABLE JOINT AND MANUFACTURING METHOD THEREFOR

(71) Applicant: GUANGDONG ANNUO NEW MATERIAL TECHNOLOGY CO., LTD., Nanhai District (CN)

(72) Inventors: Qida Zhong, Nanhai District (CN); Yining Zhong, Nanhai District (CN)

(73) Assignee: GUANGDONG ANNUO NEW MATERIAL TECHNOLOGY CO., LTD., Nanhai District (CN)

( * ) Notice: Subject to any disclaimer, the term of this patent is extended or adjusted under 35 U.S.C. 154(b) by 144 days.

(21) Appl. No.: 18/690,296

(22) PCT Filed: Sep. 18, 2023

(86) PCT No.: PCT/CN2023/119319
§ 371 (c)(1),
(2) Date: Mar. 8, 2024

(87) PCT Pub. No.: WO2024/087936
PCT Pub. Date: May 2, 2024

(65) Prior Publication Data
US 2025/0132551 A1     Apr. 24, 2025

(30) Foreign Application Priority Data
Oct. 24, 2022     (CN) ........................ 202211304135.8

(51) Int. Cl.
*H02G 15/113*          (2006.01)
*B32B 5/02*            (2006.01)
(Continued)

(52) U.S. Cl.
CPC ........... *H02G 15/113* (2013.01); *B32B 5/024* (2013.01); *B32B 5/073* (2021.05); *B32B 5/262* (2021.05);
(Continued)

(58) Field of Classification Search
CPC .......... H02G 1/14; H02G 15/10; H02G 15/11; H02G 15/113; H02G 15/18; B32B 5/02;
(Continued)

(56) References Cited

U.S. PATENT DOCUMENTS 2,960,561 A * 11/1960 Plummer ............... A44B 19/16
24/399
4,018,962 A * 4/1977 Pedlow ................... H02G 15/10
428/921
(Continued)

FOREIGN PATENT DOCUMENTS

CN          108390349          8/2018
CN          210490434 U        5/2020
(Continued)

*Primary Examiner* — William H. Mayo, III
(74) *Attorney, Agent, or Firm* — Brooks Kushman P.C.

(57)          ABSTRACT
A fire and explosion proof structure for a high-voltage cable joint includes a fire and explosion proof blanket for wrapping the high-voltage cable joint, a locking mechanism for fixing the fire and explosion proof blanket to the high-voltage cable joint, and an explosion proof net cover for wrapping the fire and explosion proof blanket and the locking mechanism. The fire and explosion proof blanket includes a first high-silica cloth layer, a first flame-retardant rubber sheet layer, a first explosion proof woven blanket layer, a second flame-retardant rubber sheet layer, and a second explosion proof woven blanket layer and a second high-silica cloth layer which are arranged in sequence from inside to outside.

20 Claims, 4 Drawing Sheets

(51) Int. Cl.

| | |
|---|---|
| *B32B 5/06* | (2006.01) |
| *B32B 5/26* | (2006.01) |
| *B32B 15/02* | (2006.01) |
| *B32B 15/14* | (2006.01) |
| *B32B 27/12* | (2006.01) |
| *B32B 37/18* | (2006.01) |
| *B32B 38/00* | (2006.01) |

(52) U.S. Cl.
CPC .............. *B32B 15/02* (2013.01); *B32B 15/14* (2013.01); *B32B 27/12* (2013.01); *B32B 37/18* (2013.01); *B32B 2038/008* (2013.01); *B32B 2262/105* (2013.01); *B32B 2305/188* (2013.01); *B32B 2307/3065* (2013.01); *B32B 2319/00* (2013.01)

(58) Field of Classification Search
CPC .......... B32B 5/024; B32B 5/073; B32B 5/14; B32B 6/44; B32B 15/06; B32B 15/092; B32B 15/10; B32B 17/02; B32B 17/06; B32B 19/04; B32B 25/08; B32B 25/20; B32B 27/02; B32B 27/06; B32B 27/12; B32B 27/32; B32B 27/34; B32B 27/38; B32B 37/18; B32B 2038/008; H01B 7/02; H01B 7/18; H01B 7/22; H01B 7/28; H01B 7/282; H01B 7/29; H01B 7/295; H01B 9/02; H01B 11/02; H01B 11/04; H01B 11/06
USPC ................ 174/36, 84 R–94 R, 110 R–122 G; 428/36.1, 36.2, 36.5, 36.91, 116, 428/253–268, 285, 287, 308–325, 327, 428/375–379, 383, 920, 921; 156/71, 78, 156/79
See application file for complete search history.

(56) References Cited

U.S. PATENT DOCUMENTS

| | | | | |
|---|---|---|---|---|
| 4,319,940 | A | * | 3/1982 | Arroyo ................... H01B 7/295 428/377 |
| 4,513,173 | A | * | 4/1985 | Merry ................... G02B 6/4436 428/377 |
| 4,767,656 | A | * | 8/1988 | Chee ....................... E04B 1/941 428/116 |
| 4,822,659 | A | * | 4/1989 | Anderson ............... B32B 5/022 428/307.3 |
| 5,326,604 | A | * | 7/1994 | Williamson .............. B32B 5/26 428/36.1 |
| 7,692,092 | B2 | * | 4/2010 | Schoke .................... A62C 3/16 174/36 |
| 7,939,764 | B2 | * | 5/2011 | Gottfried ................. H01B 7/29 174/121 A |
| 2011/0100674 | A1 | * | 5/2011 | Pagliuca ................. C08L 71/00 174/110 SR |
| 2013/0062097 | A1 | * | 3/2013 | Hammond ............... H01B 3/46 174/120 SR |
| 2016/0040962 | A1 | | 2/2016 | Rossow et al. |
| 2016/0236019 | A1 | * | 8/2016 | Fyfe ..................... B32B 27/065 |
| 2025/0242181 | A1 | * | 7/2025 | Anderson .............. B32B 7/027 |

FOREIGN PATENT DOCUMENTS

| | | |
|---|---|---|
| CN | 113036709 | 6/2021 |
| CN | 215452491 U | 1/2022 |
| CN | 217467290 U | 9/2022 |
| CN | 115513695 | 12/2022 |
| CN | 115663745 | 1/2023 |
| CN | 218449436 | 2/2023 |
| CN | 218569813 U | 3/2023 |

* cited by examiner

FIRE AND EXPLOSION PROOF STRUCTURE FOR HIGH-VOLTAGE CABLE JOINT AND MANUFACTURING METHOD THEREFOR

CROSS-REFERENCE TO RELATED APPLICATION

This application is the U.S. national phase of PCT Application No. PCT/CN2023/119319 filed on Sep. 18, 2023, which claims priority to Chinese Patent Application No. 202211304135.8 filed on Oct. 24, 2022, the disclosures of which are incorporated in their entirety by reference herein.

TECHNICAL FIELD

The present disclosure relates to the technical field of electric power systems, and in particular to a fire and explosion proof structure for a high-voltage cable joint, and a manufacturing method therefor.

BACKGROUND

As more power supply links and longer power transmission lines are required by the power grid, the power cable intermediate joint has become an indispensable part of urban power grid. The cable intermediate joint is the weakest link in the power cable line of the power grid. The cable intermediate joint, after being installed, needs to be inspected regularly during operation. Due to the defects of the quality and installation of the intermediate joint, or due to the effects of moisture, overload and other external forces, the explosion accidents of the cable intermediate joint often occur. High temperature and instantaneous energy released by the explosion are enough to blow up or burn other parallel cables in the cable trench, and may even overturn the manhole cover and destroy the trench, causing injuries to pedestrians.

SUMMARY

The technical problem to be solved by the present disclosure is to overcome the disadvantages in the prior art. A fire and explosion proof structure for a high-voltage cable joint with excellent fire and explosion proof performance, capability of effectively prolonging the service life of the high-voltage cable joint and high use safety, and a manufacturing method for the fire and explosion proof structure are provided.

To achieve the objective above, the present disclosure employs the following technical solution:

A fire and explosion proof structure for a high-voltage cable joint includes a fire and explosion proof blanket for wrapping the high-voltage cable joint, a locking mechanism for fixing the fire and explosion proof blanket to the high-voltage cable joint, and an explosion proof net cover for wrapping the fire and explosion proof blanket and the locking mechanism. The fire and explosion proof blanket includes a first high-silica cloth layer, a first flame-retardant rubber sheet layer a first explosion proof woven blanket layer, a second flame-retardant rubber sheet layer, a second explosion proof woven blanket layer and a second high-silica cloth layer which are arranged in sequence from inside to outside.

As a further improvement of the technical solution above:

Each of the first explosion proof woven blanket layer and the second explosion proof woven blanket layer is a blanket-like structure which is obtained by lapping multiple groups of explosion proof webbing in a width direction and sewing the explosion proof webbing into a whole by sewing lines.

The blanket-like structure is formed by lapping the latter group of explosion proof webbing on an upper surface of the previous group of explosion proof webbing.

The latter group of explosion proof webbing is lapped at half a width of the upper surface of the previous group of explosion proof webbing.

A long-side extension direction of each group of explosion proof webbing in the first explosion proof woven blanket layer is perpendicular to a long-side extension direction of each group of explosion proof webbing in the second explosion proof woven blanket layer.

The long-side extension direction of each group of explosion proof webbing in the first explosion proof woven blanket layer is perpendicular to an axis direction of the high-voltage cable joint, and the long-side extension direction of each group of explosion proof webbing in the second explosion proof woven blanket layer is parallel to the axis direction of the high-voltage cable joint.

The locking mechanism includes multiple groups of explosion proof tightening belts arranged at intervals, and an end of the explosion proof tightening belt is provided with a locking buckle.

Each of the explosion proof webbing, the sewing line and the explosion proof tightening belt is made of aramid fiber, and the explosion proof net cover is made of stainless steel.

A manufacturing method for a fire and explosion proof structure for a high-voltage cable joint is disclosed, including the following steps:

(S1) lapping explosion proof webbing in sequence in a width direction, lapping the latter group of explosion proof webbing at half a width of an upper surface of a previous group of explosion proof webbing, sewing each group of explosion proof webbing into a whole by sewing lines, so as to obtain a first explosion proof woven blanket layer and a second explosion proof woven blanket layer, respectively;

(S2) longitudinally arranging the first explosion proof woven blanket layer, and transversely arranging the second explosion proof woven blanket layer, and sequentially laminating a first high-silica cloth layer, a first flame-retardant rubber sheet layer, the first explosion proof woven blanket layer, a second flame-retardant rubber sheet layer, the second explosion proof woven blanket layer and a second high-silica cloth layer from top to bottom, and then sewing, by the sewing lines, the first high-silica cloth layer, the first flame-retardant rubber sheet layer, the first explosion proof woven blanket layer, the second flame-retardant rubber sheet layer, the second explosion proof woven blanket layer and the second high-silica cloth layer into a whole to obtain a fire and explosion proof blanket;

(S3) taking one side of the first high-silica cloth layer as an inner side, and wrapping a high-voltage cable joint with the fire and explosion proof blanket;

(S4) surrounding and locking an outer side of the fire and explosion proof blanket with a locking mechanism; and (S5) wrapping and locking outer sides of the fire and explosion proof blanket and the locking mechanism with the explosion proof net cover.

A manufacturing method for a fire and explosion proof structure for a high-voltage cable joint is disclosed, including the following steps:

(S1) lapping explosion proof webbing in sequence in a width direction, lapping the latter group of explosion proof webbing at half a width of an upper surface of a previous group of explosion proof webbing, sewing each group of explosion proof webbing into a whole by sewing lines, so as to obtain a first explosion proof woven blanket layer and a second explosion proof woven blanket layer, respectively;

(S2) wrapping a high-voltage cable joint with a first high-silica cloth layer;

(S3) longitudinally arranging a first explosion proof woven blanket layer, and wrapping the first high-silica cloth layer with a first flame-retardant rubber sheet layer;

(S4) wrapping the first flame-retardant rubber sheet layer with the first explosion proof woven blanket layer;

(S5) wrapping the first explosion proof woven blanket layer with a second flame-retardant rubber sheet layer;

(S6) transversely arranging a second explosion proof woven blanket layer, and wrapping the second flame-retardant rubber sheet layer with the second explosion proof woven blanket layer;

(S7) wrapping the second explosion proof woven blanket layer with a second high-silica cloth layer;

(S8) surrounding and locking an outer side of the second high-silica cloth layer with a locking mechanism; and (S9) wrapping and locking outer sides of the second high-silica cloth layer and the locking mechanism with an explosion proof net cover.

Compared with the prior art, the present disclosure has beneficial effects as follows:

A fire and explosion proof structure for a high-voltage cable joint provided by the present disclosure is used for wrapping the high-voltage cable joint, and includes a first high-silica cloth layer, a first flame-retardant rubber sheet layer a first explosion proof woven blanket layer, a second flame-retardant rubber sheet layer, a second explosion proof woven blanket layer, a second high-silica cloth layer, a locking mechanism and an explosion proof net cover which are sequentially arranged from inside to outside. The fire and explosion proof blanket 2 with multi-layer structure not only enhances the sealing performance at the high-voltage cable joint, but also has high overall structural strength. The locking mechanism 3 can provide support for the fire and explosion proof blanket from the outside to effectively prevent the explosion or combustion from inside to outside. The fire and explosion proof performance are excellent, and the service life of the high-voltage cable joint is effectively prolonged. Further, the outer sides of the fire and explosion proof blanket and the locking mechanism are wrapped with the explosion proof net cover, which can prevent debris from splashing even if the fire and explosion proof blanket and the locking mechanism fail and break, and thus the use safety is high.

A first manufacturing method for the first fire and explosion proof structure for the high-voltage cable joint provided by the present disclosure includes the following steps: firstly, lapping and sewing multiple groups of explosion proof webbing to prepare a first explosion proof woven blanket layer and a second explosion proof woven blanket layer; then, sequentially laminating and sewing high-silica cloth, a flame-retardant rubber sheet, a first explosion proof woven blanket layer, a flame-retardant rubber sheet, a second explosion proof woven blanket layer and high-silica cloth from top to bottom to prepare a fire and explosion proof blanket; and wrapping the high-voltage cable joint with the fire and explosion proof blanket, fixing the fire and explosion proof blanket with a locking mechanism, and providing an explosion proof net cover on the outer sides of the fire and explosion proof blanket and the locking mechanism. By preparing the multi-layer structure into the whole fire and explosion proof blanket (that is, a preform) in advance, the size of the fire and explosion proof blanket can be flexibly cut according to different specifications of the high-voltage cable joints to be applied, the fire and explosion proof blanket is convenient and fast to take and has high reliability, the construction difficulty of temporary assembly is reduced, and the construction efficiency can be effectively improved.

A second manufacturing method for a fire and explosion proof structure for a high-voltage cable joint includes the following steps: firstly, lapping and sewing multiple groups of explosion proof webbing to prepare a first explosion proof woven blanket layer and a second explosion proof woven blanket layer, where in this embodiment, the flame-retardant rubber sheet is a semi-cylindrical coiled material, and then wrapping the high-voltage cable joint with high-silica cloth accordingly; connecting the upper and lower flame-retardant rubber sheet coiled materials, and wrapping the first high-silica cloth layer with the connected flame-retardant rubber sheet coiled materials; wrapping a first flame-retardant rubber sheet layer with the first explosion proof woven blanket layer; connecting the upper and lower flame-retardant rubber sheet coiled materials, and wrapping the first explosion proof woven blanket layer with the connected flame-retardant rubber sheet coiled materials; wrapping a second flame-retardant rubber sheet layer with a second explosion proof woven blanket layer; wrapping the second explosion proof woven blanket layer with high-silica cloth. A locking mechanism is fixedly connected to the second high-silica cloth layer, and the explosion proof net cover is arranged on the outer sides of the second high-silica cloth layer and the locking mechanism. By wrapping and assembling the multi-layer structure in sequence, various layers of structures are relatively independent, and when one layer of structure is damaged, only this layer of structure can be replaced, and the fire and explosion proof blanket does not need to be replaced as a whole, thus effectively reducing the maintenance cost.

Figure 1:
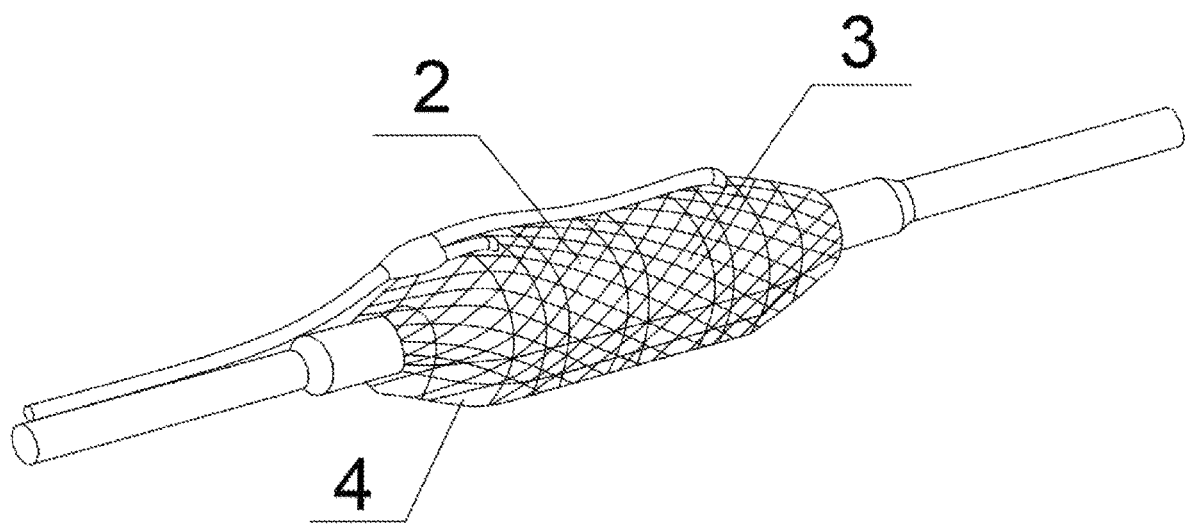
FIG. 1 is an assembly schematic diagram of a fire and explosion proof structure for a high-voltage cable joint.
Figure 2:
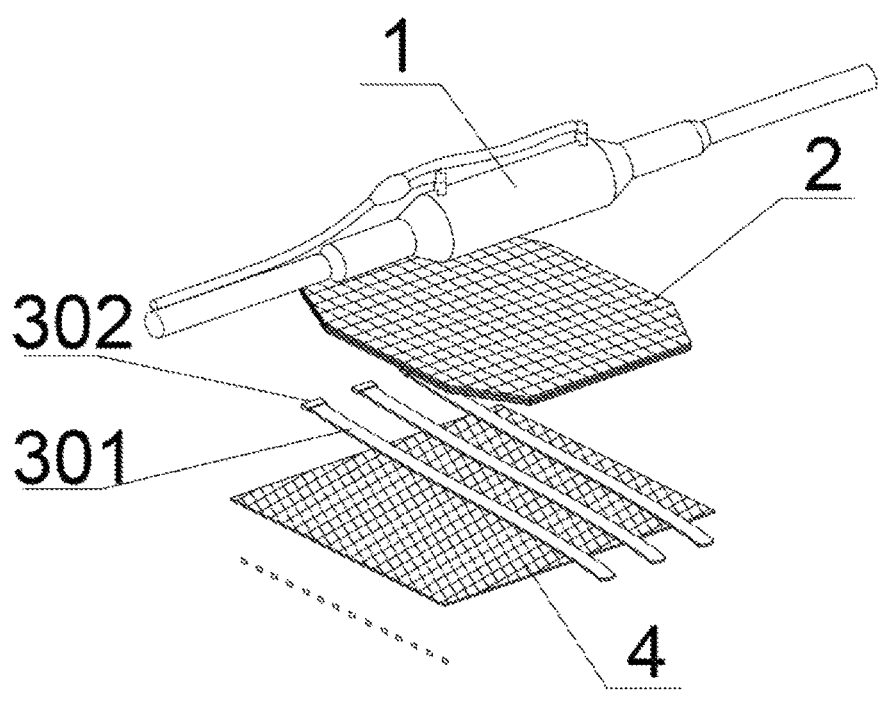
FIG. 2 is a structural schematic diagram of an exploded state of Embodiment 1 of a fire and explosion proof structure for a high-voltage cable joint.
Figure 3:
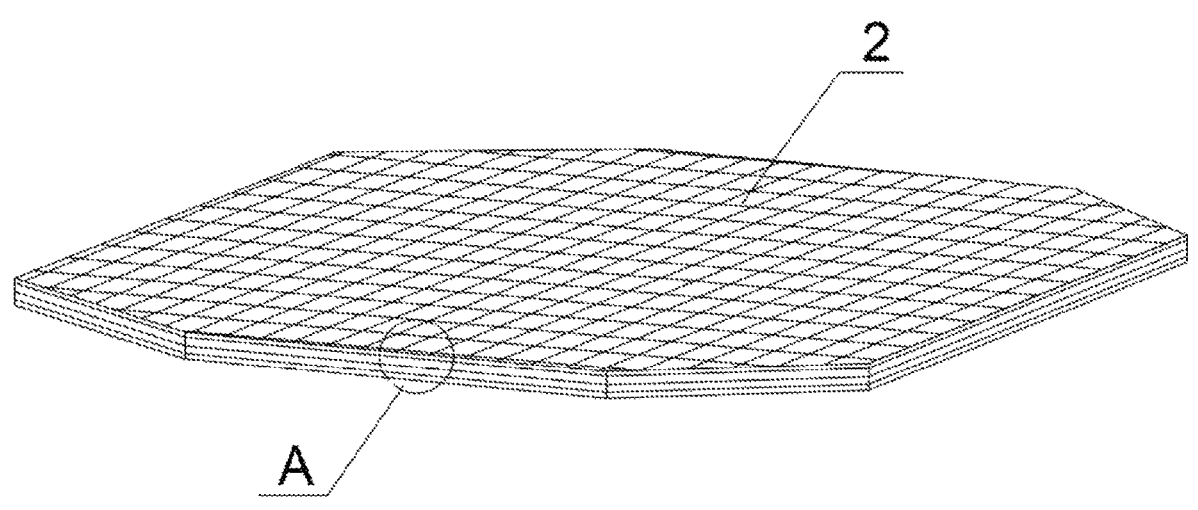
FIG. 3 is a structural schematic diagram of a fire and explosion proof blanket of Embodiment 1.
Figure 4:
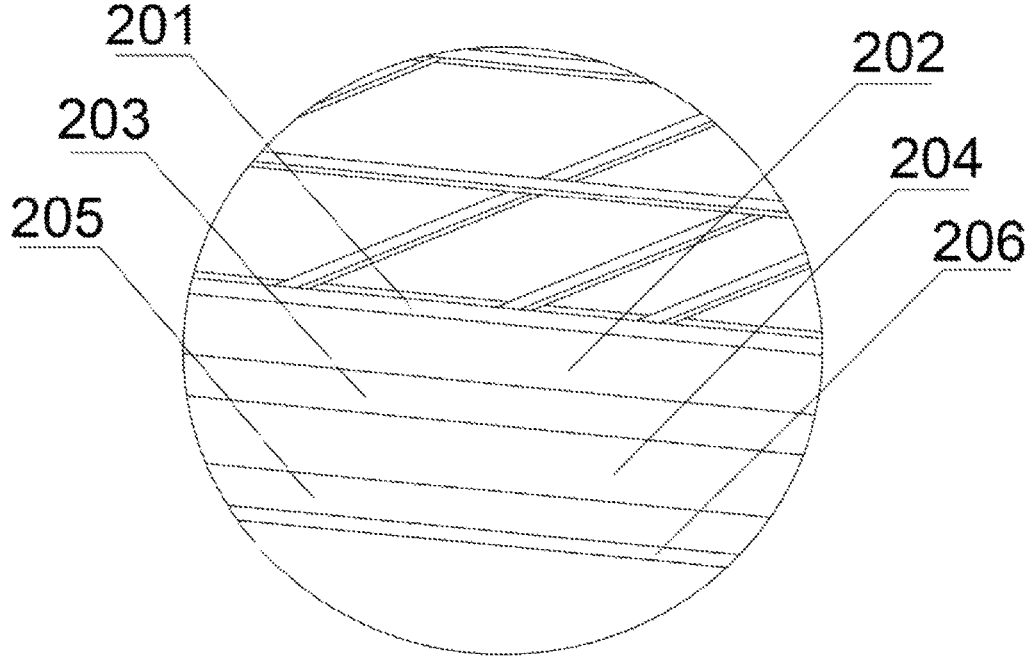
FIG. 4 is an enlarged view of detail A in FIG. 3.

1—high-voltage cable joint; 2—fire and explosion proof blanket; 201—first high-silica cloth layer; 202—first flame-retardant rubber sheet layer; 203—first explosion proof woven blanket layer; 204—second flame-retardant rubber sheet layer; 205—second explosion proof woven blanket layer; 206—second high-silica cloth layer; 3—locking mechanism; 301—explosion proof tightening belt; 302—locking buckle; 4—explosion proof net cover; 5—explosion proof webbing.

DETAILED DESCRIPTION OF THE EMBODIMENTS

The present disclosure is further described below with reference to accompanying drawings and specific embodiments.

Embodiment 1

As shown in FIG. 1 to FIG. 4, 1. a fire and explosion proof structure for a high-voltage cable joint provided by the present disclosure includes a fire and explosion proof blanket 2 for wrapping the high-voltage cable joint 1, a locking mechanism 3 for fixing the fire and explosion proof blanket 2 to the high-voltage cable joint 1, and an explosion proof net cover 4 for wrapping the fire and explosion proof blanket 2 and the locking mechanism 3, wherein the fire and explosion proof blanket 2 comprises a first high-silica cloth layer 201, a first flame-retardant rubber sheet layer 202, a first explosion proof woven blanket layer 203, a second flame-retardant rubber sheet layer 204, and a second explosion proof woven blanket layer 205 and a second high-silica cloth layer 206 which are arranged in sequence from inside to outside. The fire and explosion proof structure for a high-voltage cable joint is used for wrapping the high-voltage cable joint 1, and includes a first high-silica cloth layer 201, a first flame-retardant rubber sheet layer 202, a first explosion proof woven blanket layer 203, a second flame-retardant rubber sheet layer 204, a second explosion proof woven blanket layer 205, a second high-silica cloth layer 206, a locking mechanism 3 and an explosion proof net cover 4 which are sequentially arranged from inside to outside. The fire and explosion proof blanket 2 with multi-layer structure not only enhances the sealing performance at the high-voltage cable joint 1, but also has high overall structural strength. The locking mechanism 3 can provide support for the fire and explosion proof blanket 2 from the outside to effectively prevent the explosion or combustion from inside to outside. The fire and explosion proof performance are excellent, and the service life of the high-voltage cable joint 1 is effectively prolonged. Further, the outer sides of the fire and explosion proof blanket 2 and the locking mechanism 3 are wrapped with the explosion proof net cover 4, which can prevent debris from splashing even if the fire and explosion proof blanket 2 and the locking mechanism 3 fail and break, and thus the use safety is high.

Figure 5:
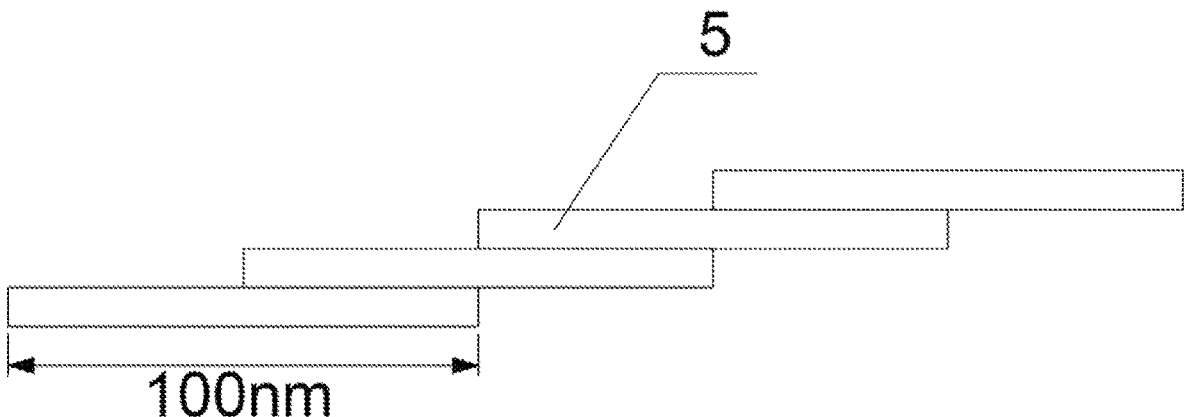
FIG. 5 is a schematic diagram of the lapping of explosion proof webbing.

As shown in FIG. 5, preferably, each of the first explosion proof woven blanket layer 203 and the second explosion proof woven blanket layer 205 is a blanket-like structure which is obtained by lapping multiple groups of explosion proof webbing 5 in a width direction and sewing the explosion proof webbing into a whole by sewing lines. In this embodiment, the first explosion proof woven blanket layer 203 and the second explosion proof woven blanket layer 205 have the same structure, and both are blanket-like structures obtained by lapping multiple groups of explosion proof webbing 5 in the width direction and sewing the explosion proof webbing into a whole by sewing lines. Through the above structure, when an explosion occurs inside or outside, the explosion proof woven blanket layer 203 is deformed and not easy to break, thus preventing the spread of heat and impact, and playing an excellent explosion proof effect.

Preferably, the blanket-like structure is formed by lapping the latter group of explosion proof webbing 5 on an upper surface of the previous group of explosion proof webbing 5. In this embodiment, the blanket-like structure adopts the lapping form that the latter group of explosion proof webbing 5 is lapped on the upper surface of the previous group of explosion proof webbing 5, with an objective to facilitate the manufacturing of the first explosion proof woven blanket layer 203 and the second explosion proof woven blanket layer 205 and improve the manufacturing efficiency. In other embodiments, the blanket-like structure can also adopt a lapping form that a second group of explosion proof webbing 5 is lapped on an upper surface of a first group of explosion proof webbing 5, and a third group of explosion proof webbing 5 is lapped on a lower surface of the second group of explosion proof webbing 5. It can also adopt a lapping form that two second groups of explosion proof webbing 5 are lapped on an upper surface and a lower surface of the first group of explosion proof webbing 5, respectively, and the third group of explosion proof webbing 5 is lapped between two second groups of explosion proof webbing 5. The lapping form is not limited to this embodiment.

Preferably, the latter group of explosion proof webbing 5 is lapped at half a width of the upper surface of the previous group of the explosion proof webbing 5. In this embodiment, the explosion proof webbing 5 has a width of 100 mm, and the latter group of explosion proof webbing 5 is lapped at half the width of the previous group of explosion proof webbing 5, and then the explosion proof webbing 5 is sewn into a whole by sewing lines, which can further enhance the structural strength of the first explosion proof woven blanket layer 203 and the second explosion proof woven blanket layer 205 and improve the explosion proof effect.

Preferably, a long-side extension direction of each group of explosion proof webbing 5 in the first explosion proof woven blanket layer 203 is perpendicular to a long-side extension direction of each group of explosion proof webbing 5 in the second explosion proof woven blanket layer 205. In this embodiment, an arrangement direction of the multiple groups of explosion proof webbing 5 constituting the first explosion proof woven blanket layer 203 is perpendicular to an arrangement direction of multiple groups of explosion proof webbing 5 constituting the second explosion proof woven blanket layer 205. That is, the first explosion proof woven blanket layer 203 is placed in a warp direction (longitudinal direction) and the second explosion proof woven blanket layer 205 is placed in a weft direction (transverse direction), such that the first explosion-proof woven blanket layer 203 and the second explosion-proof woven blanket layer 205 in the fire and explosion proof blanket 2 are arranged in the warp and weft directions, and the explosion proof webbing 5 overlap horizontally and vertically, which can effectively increase the tensile force, enhance the structural strength of the fire and explosion proof blanket 2, and have good explosion and fire proof effects.

Preferably, the long-side extension direction of each group of the explosion proof webbing 5 in the first explosion proof woven blanket layer 203 is perpendicular to an axis direction of the high-voltage cable joint 1, and the long-side extension direction of each group of explosion proof webbing 5 in the second explosion proof woven blanket layer 205 is parallel to the axis direction of the high-voltage cable joint 1. In this embodiment, a direction perpendicular to the axis of the high-voltage cable joint 1 is used as the longitudinal direction and a direction parallel to the axis of the high-voltage cable joint 1 is used as the transverse direction (the same as below). In the fire and explosion proof blanket 2, the first explosion proof woven blanket layer 203 is arranged longitudinally, that is, the long-side extension direction of each group of explosion proof webbing 5 in the first explosion proof woven blanket layer 203 is perpendicular to the axis direction of the high-voltage cable joint 1. The second explosion proof woven blanket layer 205 is arranged transversely, that is, the long-side extension direction of each group of explosion proof webbing 5 in the second explosion proof woven blanket layer 205 is parallel to the axis direction of the high-voltage cable joint 1. When an explosion occurs inside the high-voltage cable joint 1 and the impact force is concentrated in a certain direction, the first explosion proof woven blanket layer 203 can disperse the impact force to each group of explosion proof webbing 5, thus playing an effective buffering role and providing high tear resistance.

Preferably, the locking mechanism 3 includes multiple groups of explosion proof tightening belts 301 arranged at intervals, and an end of the explosion proof tightening belt 301 is provided with a locking buckle 302. In this embodiment, the locking mechanism 3 employs the form of explosion proof tightening belt 301, and one end of the explosion proof tightening belt 301 is provided with a locking buckle 302. During installation, the explosion proof tightening belt 301 longitudinally surrounds the outer side of the fire and explosion proof blanket 2, and the fire and explosion proof blanket 2 can be tightly held on the high-voltage cable joint 1 by inserting a free end of the explosion proof tightening belt 301 into the locking buckle 302. The locking mechanism has the advantages of simple structure, convenient and rapid installation and disassembly processes, and low cost.

Preferably, each of the explosion proof webbing 5, the sewing line and the explosion proof tightening belt 301 is made of aramid fiber, and the explosion proof net cover 4 is made of stainless steel. In this embodiment, the aramid fiber, called "aromatic polyamide fiber", is a novel high-tech synthetic fiber with excellent properties such as ultra-high strength, high modulus, high temperature resistance, acid resistance and alkali resistance, light weight, etc. Each of the explosion proof webbing 5, the sewing line and the explosion proof tightening belt 301 is made of aramid fiber, which has good fire resistance. The explosion proof net cover 4 is made of stainless steel, which has the advantage of high structural strength.

A manufacturing method for a fire and explosion proof structure for a high-voltage cable joint in this embodiment includes the following steps.

(S1) Explosion proof webbing 5 is lapped in a width direction in sequence, the latter group of explosion proof webbing 5 is lapped at half a width of an upper surface of a previous group of explosion proof webbing 5, various groups of explosion proof webbing 5 are sewn into a whole by sewing lines, so as to obtain a first explosion proof woven blanket layer 203 and a second explosion proof woven blanket layer 205, respectively.

(S2) The first explosion proof woven blanket layer 203 is longitudinally arranged, and the second explosion proof woven blanket layer 205 are transversely arranged, and a first high-silica cloth layer 201, a first flame-retardant rubber sheet layer 202, the first explosion proof woven blanket layer 203, a second flame-retardant rubber sheet layer 204, the second explosion proof woven blanket layer 205 and a second high-silica cloth layer 206 are sequentially laminated from top to bottom and sewn by the sewing lines into a whole to obtain a fire and explosion proof blanket 2.

(S3) One side of the first high-silica cloth layer 201 is used as an inner side, and a high-voltage cable joint 1 is wrapped with the fire and explosion proof blanket 2.

(S4) A locking mechanism 3 surrounds and locks an outer side of the fire and explosion proof blanket 2.

(S5) An explosion proof net cover 4 wraps and locks outer sides of the fire and explosion proof blanket 2 and the locking mechanism 3.

A first manufacturing method for the first fire and explosion proof structure for the high-voltage cable joint provided by the present disclosure includes the following steps: firstly, multiple groups of explosion proof webbing 5 are lapped and sewn to prepare a first explosion proof woven blanket layer 203 and a second explosion proof woven blanket layer 205. Then, high-silica cloth, a flame-retardant rubber sheet, a first explosion proof woven blanket layer, a flame-retardant rubber sheet, a second explosion proof woven blanket layer and high-silica cloth from top to bottom are laminated and sewn in sequence from top to bottom to prepare a fire and explosion proof blanket 2. The high-voltage cable joint 1 is wrapped with the fire and explosion proof blanket 2, the fire and explosion proof blanket 2 is fixed by a locking mechanism 3, and an explosion proof net cover 4 is provided at outer sides of the fire and explosion proof blanket 2 and the locking mechanism 3. By preparing the multi-layer structure into the whole fire and explosion proof blanket 2 (that is, a preform) in advance, the size of the fire and explosion proof blanket 2 can be flexibly cut according to different specifications of the high-voltage cable joints 1 to be applied, the fire and explosion proof blanket is convenient and fast to take and has high reliability, the construction difficulty of temporary assembly is reduced, and the construction efficiency can be effectively improved.

Embodiment 2

Figure 6:
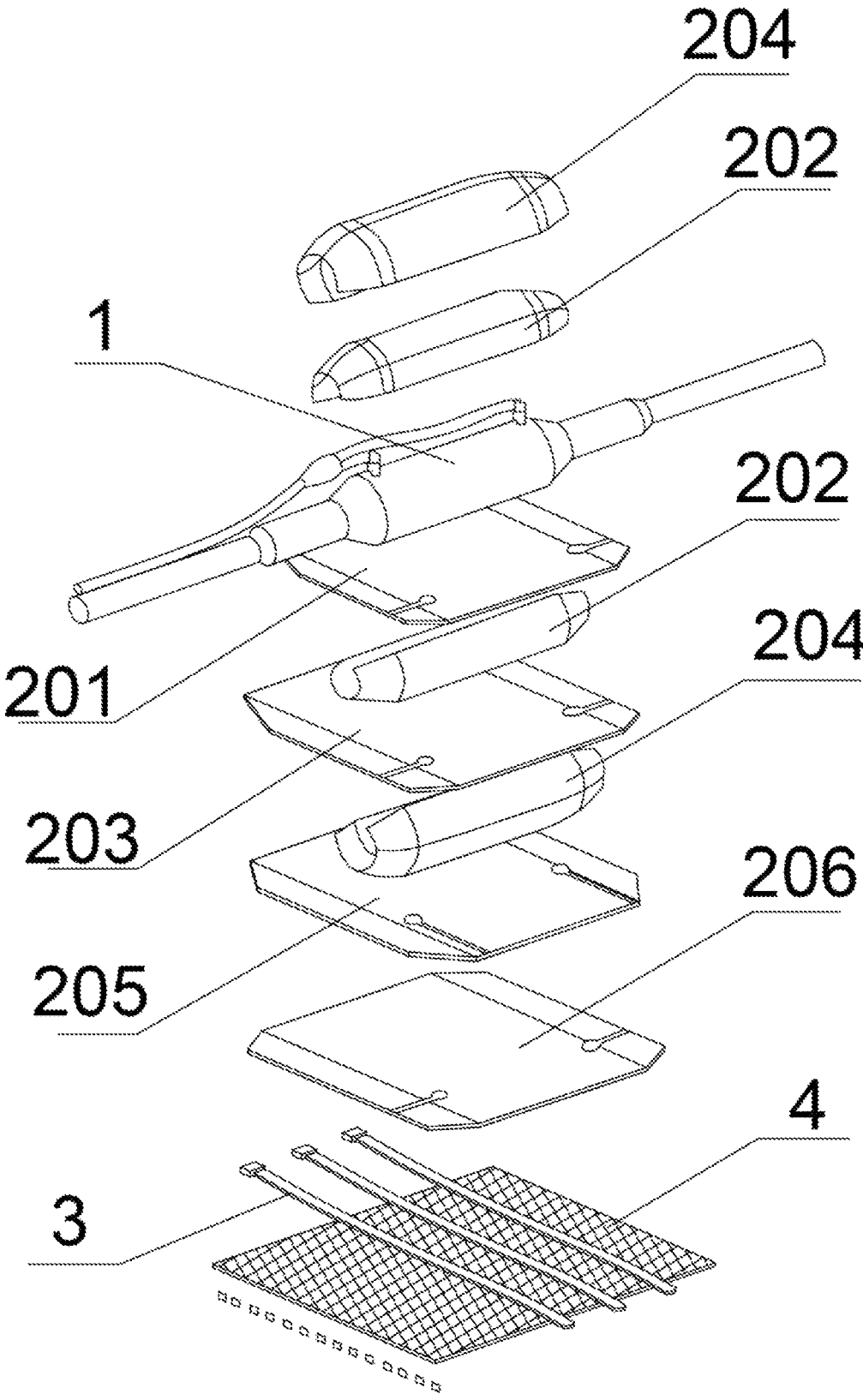
FIG. 6 is a structural schematic diagram of an exploded state of Embodiment 2 of a fire and explosion proof structure for a high-voltage cable joint.

As shown in FIG. 6, a manufacturing method for a fire and explosion proof structure for a high-voltage cable joint in this embodiment includes the following steps:

(S1) Explosion proof webbing 5 is lapped in a width direction in sequence, the latter group of explosion proof webbing 5 is lapped at half a width of an upper surface of a previous group of explosion proof webbing 5, various groups of explosion proof webbing 5 are sewn into a whole by sewing lines, so as to obtain a first explosion proof woven blanket layer 203 and a second explosion proof woven blanket layer 205, respectively.

(S2) A high-voltage cable joint 1 is wrapped with a first high-silica cloth layer 201.

(S3) The first high-silica cloth layer 201 is wrapped with a first flame-retardant rubber sheet layer 202.

(S4) A first explosion proof woven blanket layer 203 is longitudinally arranged, and the first flame-retardant rubber sheet layer 202 is wrapped with the first explosion proof woven blanket layer 203.

(S5) The first explosion proof woven blanket layer 203 is wrapped with a second flame-retardant rubber sheet layer 204.

(S6) A second explosion proof woven blanket layer 205 is longitudinally arranged, and the second flame-retardant rubber sheet layer 204 is wrapped with the second explosion proof woven blanket layer 205.

(S7) The second explosion proof woven blanket layer 205 is wrapped with a second high-silica cloth layer 206.

(S8) The locking mechanism 3 surrounds and lock an outer side of the second high-silica cloth layer 206.

(S9) An explosion proof net cover 4 wraps and locks outer sides of the second high-silica cloth layer 206 and the locking mechanism 3.

A manufacturing method for a fire and explosion proof structure for a high-voltage cable joint in Embodiment 2 includes the following steps: firstly, multiple groups of explosion proof webbing 5 are lapped and sewn to prepare a first explosion proof woven blanket layer 203 and a second explosion proof woven blanket layer 205, in this embodiment, the flame-retardant rubber sheet is a semi-cylindrical coiled material, and then the high-voltage cable joint is wrapped with high-silica cloth accordingly. Upper and lower flame-retardant rubber sheet coiled materials are connected, and the first high-silica cloth layer 201 is wrapped with the connected flame-retardant rubber sheet coiled materials. A first flame-retardant rubber sheet layer 202 is wrapped with the first explosion proof woven blanket layer 203. The upper and lower flame-retardant rubber sheet coiled materials are connected, and the first explosion proof woven blanket layer 203 is wrapped with the connected flame-retardant rubber sheet coiled materials to obtain a second flame-retardant rubber sheet layer 204. The second flame-retardant rubber sheet layer 204 is wrapped with the second explosion proof woven blanket layer 205. The second explosion proof woven blanket layer 205 is wrapped with high-silica cloth to obtain a second high-silica cloth layer 206. A locking mechanism 3 is fixedly connected to the second high-silica cloth layer 206, and an explosion proof net cover 4 is arranged on the outer sides of the second high-silica cloth layer 206 and the locking mechanism 3. By wrapping and assembling the multi-layer structure in sequence, various layers of structures are relatively independent, and when one layer of structure is damaged, only this layer of structure can be replaced, the fire and explosion proof blanket 2 does not need to be replaced as a whole, and the maintenance cost is effectively reduced.

The fire and explosion proof structure for the high-voltage cable joint manufactured by the method provided by this embodiment is consistent with that manufactured by the method provided by Embodiment 1, and the difference is that in Embodiment 1, the multi-layer structure is prepared into a whole in advance, and thus the installation step is simplified, and the construction efficiency is improved. While in Embodiment 2, the multi-layer structure is wrapped and assembled in sequence, and the layers are relatively independent, so that if any layer of the structure is damaged or fails, the layer structure can be accurately replaced without overall disassembly and replacement, and the maintenance cost can be effectively reduced.

The above is only the preferred embodiment of the present disclosure, and the scope of protection of the present disclosure is not limited to the above embodiments. For those of ordinary skill in the art, various improvements and changes made without departing from the technical concept of the present disclosure shall be regarded as the scope of protection of the present disclosure.

What is claimed is:

1. A fire and explosion proof structure for a high-voltage cable joint, comprising a fire and explosion proof blanket for wrapping the high-voltage cable joint, a locking mechanism for fixing the fire and explosion proof blanket to the high-voltage cable joint, and an explosion proof net cover for wrapping the fire and explosion proof blanket and the locking mechanism, wherein the fire and explosion proof blanket comprises a first high-silica cloth layer, a first flame-retardant rubber sheet layer, a first explosion proof woven blanket layer, a second flame-retardant rubber sheet layer, a second explosion proof woven blanket layer and a second high-silica cloth layer which are arranged in sequence from inside to outside.

2. The fire and explosion proof structure for a high-voltage cable joint according to claim 1, wherein each of the first explosion proof woven blanket layer and the second explosion proof woven blanket layer is a blanket-like structure which is obtained by lapping a plurality of groups of explosion proof webbing in a width direction and sewing the explosion proof webbing into a whole by sewing lines.

3. The fire and explosion proof structure for a high-voltage cable joint according to claim 2, wherein the blanket-like structure is formed by lapping the latter group of explosion proof webbing on an upper surface of the previous group of explosion proof webbing.

4. The fire and explosion proof structure for a high-voltage cable joint according to claim 3, wherein the latter group of explosion proof webbing is lapped at half a width of the upper surface of the previous group of explosion proof webbing.

5. The fire and explosion proof structure for a high-voltage cable joint according to claim 2, wherein a long-side extension direction of each group of explosion proof webbing in the first explosion proof woven blanket layer is perpendicular to a long-side extension direction of each group of explosion proof webbing in the second explosion proof woven blanket layer.

6. The fire and explosion proof structure for a high-voltage cable joint according to claim 5, wherein the long-side extension direction of each group of explosion proof webbing in the first explosion proof woven blanket layer is perpendicular to an axis direction of the high-voltage cable joint, and the long-side extension direction of each group of explosion proof webbing in the second explosion proof woven blanket layer is parallel to the axis direction of the high-voltage cable joint.

7. The fire and explosion proof structure for a high-voltage cable joint according to claim 2, wherein the locking mechanism comprises a plurality of groups of explosion proof tightening belts arranged at intervals, and an end of the explosion proof tightening belt is provided with a locking buckle .

8. The fire and explosion proof structure for a high-voltage cable joint according to claim 7, wherein each of the explosion proof webbing, the sewing line and the explosion proof tightening belt is made of aramid fiber, and the explosion proof net cover is made of stainless steel.

9. A manufacturing method for the fire and explosion proof structure for a high-voltage cable joint according to claim 1, comprising the following steps:

(S1) lapping explosion proof webbing in sequence in a width direction, lapping the latter group of explosion proof webbing at half a width of an upper surface of a previous group of explosion proof webbing, sewing each group of explosion proof webbing into a whole by sewing lines, so as to obtain a first explosion proof woven blanket layer and a second explosion proof woven blanket layer, respectively;

(S2) longitudinally arranging the first explosion proof woven blanket layer, and transversely arranging the second explosion proof woven blanket layer, and sequentially laminating a first high-silica cloth layer, a first flame-retardant rubber sheet layer, the first explosion proof woven blanket layer, a second flame-retardant rubber sheet layer, the second explosion proof woven blanket layer and a second high-silica cloth layer from top to bottom, and then sewing, by the sewing lines, the first high-silica cloth layer, the first flame-retardant rubber sheet layer, the first explosion proof woven blanket layer, the second flame-retardant rubber sheet layer, the second explosion proof woven blanket layer and the second high-silica cloth layer into a whole to obtain a fire and explosion proof blanket;

(S3) taking one side of the first high-silica cloth layer as an inner side, and wrapping a high-voltage cable joint with the fire and explosion proof blanket;

(S4) surrounding and locking an outer side of the fire and explosion proof blanket with a locking mechanism; and (S5) wrapping and locking outer sides of the fire and explosion proof blanket and the locking mechanism with the explosion proof net cover.

10. The manufacturing method according to claim 9, wherein each of the first explosion proof woven blanket layer and the second explosion proof woven blanket layer is a blanket-like structure which is obtained by lapping a plurality of groups of explosion proof webbing in a width direction and sewing the explosion proof webbing into a whole by sewing lines.

11. The manufacturing method according to claim 10, wherein a long-side extension direction of each group of explosion proof webbing in the first explosion proof woven blanket layer is perpendicular to a long-side extension direction of each group of explosion proof webbing in the second explosion proof woven blanket layer.

12. The manufacturing method according to claim 11, wherein the long-side extension direction of each group of explosion proof webbing in the first explosion proof woven blanket layer is perpendicular to an axis direction of the high-voltage cable joint, and the long-side extension direction of each group of explosion proof webbing in the second explosion proof woven blanket layer is parallel to the axis direction of the high-voltage cable joint.

13. The manufacturing method according to claim 10, wherein the locking mechanism comprises a plurality of groups of explosion proof tightening belts arranged at intervals, and an end of the explosion proof tightening belt is provided with a locking buckle.

14. The manufacturing method according to claim 13, wherein each of the explosion proof webbing, the sewing line and the explosion proof tightening belt is made of aramid fiber, and the explosion proof net cover is made of stainless steel.

15. A manufacturing method for the fire and explosion proof structure for a high-voltage cable joint according to claim 1, comprising the following steps:

(S1) lapping explosion proof webbing in sequence in a width direction, lapping the latter group of explosion proof webbing at half a width of an upper surface of a previous group of explosion proof webbing, sewing each group of explosion proof webbing into a whole by sewing lines, so as to obtain a first explosion proof woven blanket layer and a second explosion proof woven blanket layer, respectively;

(S2) wrapping a high-voltage cable joint with a first high-silica cloth layer;

(S3) longitudinally arranging a first explosion proof woven blanket layer, and wrapping the first high-silica cloth layer with a first flame-retardant rubber sheet layer;

(S4) wrapping the first flame-retardant rubber sheet layer with the first explosion proof woven blanket layer;

(S5) wrapping the first explosion proof woven blanket layer with a second flame-retardant rubber sheet layer;

(S6) transversely arranging a second explosion proof woven blanket layer, and wrapping the second flame-retardant rubber sheet layer with the second explosion proof woven blanket layer;

(S7) wrapping the second explosion proof woven blanket layer with a second high-silica cloth layer;

(S8) surrounding and locking an outer side of the second high-silica cloth layer with a locking mechanism; and (S9) wrapping and locking outer sides of the second high-silica cloth layer and the locking mechanism with an explosion proof net cover.

16. The manufacturing method according to claim 15, wherein the blanket-like structure is formed by lapping the latter group of explosion proof webbing on an upper surface of the previous group of explosion proof webbing.

17. The manufacturing method according to claim 16, wherein the latter group of explosion proof webbing is lapped at half a width of the upper surface of the previous group of explosion proof webbing.

18. The manufacturing method according to claim 15, wherein each of the first explosion proof woven blanket layer and the second explosion proof woven blanket layer is a blanket-like structure which is obtained by lapping a plurality of groups of explosion proof webbing in a width direction and sewing the explosion proof webbing into a whole by sewing lines.

19. The manufacturing method according to claim 18, wherein the blanket-like structure is formed by lapping the latter group of explosion proof webbing on an upper surface of the previous group of explosion proof webbing.

20. The manufacturing method according to claim 19, wherein the latter group of explosion proof webbing is lapped at half a width of the upper surface of the previous group of explosion proof webbing.

* * * * *